US008896562B2

(12) United States Patent
Horiguchi

(10) Patent No.: US 8,896,562 B2
(45) Date of Patent: Nov. 25, 2014

(54) PORTABLE TERMINAL, KEY OPERATION CONTROL METHOD THEREOF, AND PROGRAM

(75) Inventor: Toshikazu Horiguchi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 14/122,775

(22) PCT Filed: Sep. 15, 2011

(86) PCT No.: PCT/JP2011/071120
§ 371 (c)(1),
(2), (4) Date: Nov. 27, 2013

(87) PCT Pub. No.: WO2012/164765
PCT Pub. Date: Dec. 6, 2012

(65) Prior Publication Data
US 2014/0104217 A1 Apr. 17, 2014

(30) Foreign Application Priority Data
May 30, 2011 (JP) .................................. 2011-120345

(51) Int. Cl.
*G06F 3/041* (2006.01)
(52) U.S. Cl.
CPC ...................................... *G06F 3/041* (2013.01)
USPC .......................... 345/173; 715/863; 178/18.01
(58) Field of Classification Search
CPC .......................... H04N 1/00411; G06F 3/04886
USPC ......................................................... 345/173
See application file for complete search history.

(56) References Cited

U.S. PATENT DOCUMENTS 7,397,465 B2 * 7/2008 Noji ............................... 345/173
2007/0277124 A1 * 11/2007 Shin et al. ..................... 715/863

FOREIGN PATENT DOCUMENTS

| JP | S63-226716 A | 9/1988 |
| JP | H10-113969 A | 5/1998 |
| JP | 2005-11233 A | 1/2005 |
| JP | 2009-9424 A | 1/2009 |
| JP | 2011-39990 A | 2/2011 |

OTHER PUBLICATIONS

International Search Report for PCT Application No. PCT/JP2011/071120 mailed on Nov. 22, 2011.
Japanese Office Action for JP Application No. 2011-120345 mailed on Nov. 16, 2011 with English Translation.

* cited by examiner

*Primary Examiner* — Gerald Johnson
(74) *Attorney, Agent, or Firm* — Sughrue Mion, PLLC

(57) ABSTRACT

To prevent a user from erroneously touching a key part arranged outside a display unit on a touch panel while operating the display unit via the touch panel, causing an erroneous operation.
A portable terminal includes a display unit, a touch panel which is arranged on the display unit and a part other than the display unit extended from the display unit and is directed for detecting a position touched by a user on the display unit and outside the display unit, a key part which is arranged outside the display unit on the touch panel and is capable of detecting key pressing via the touch panel, and a control unit which, when detecting that the user touches a detection area set near the key part of the display unit via the touch panel, even if detecting that the user touches the key part, does not process the touch on the key part as key pressing.

8 Claims, 9 Drawing Sheets

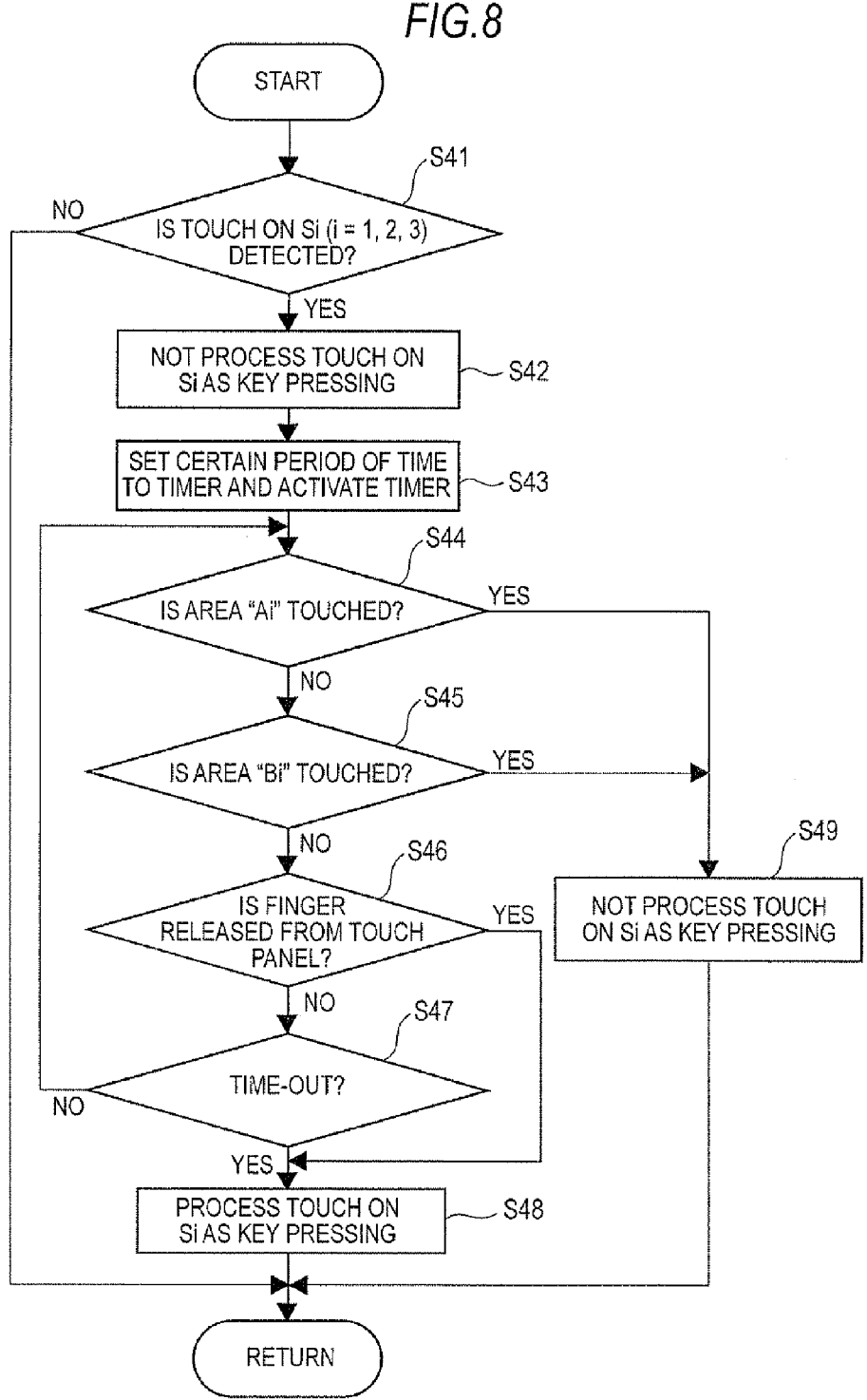

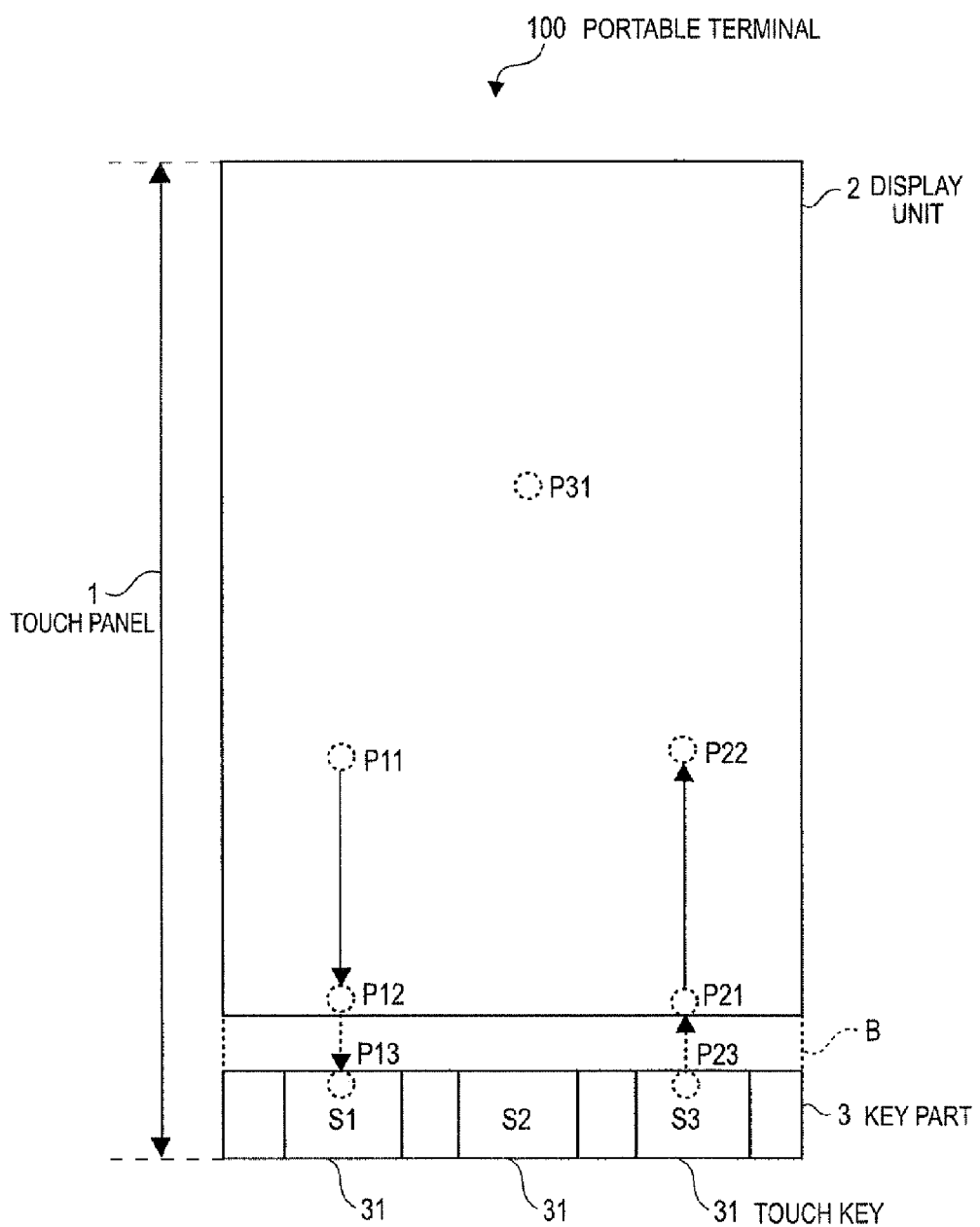

PORTABLE TERMINAL, KEY OPERATION CONTROL METHOD THEREOF, AND PROGRAM

This application is a National Stage Entry of PCT/JP2011/071120 filed on Sep. 15, 2011, which claims priority from Japanese Patent Application 2011-120345 filed on May 30, 2011, the contents of all of which are incorporated herein by reference, in their entirety.

TECHNICAL FIELD

The present invention relates to a portable terminal, a key operation control thereof, and a program, and particularly, to a portable terminal in which a key part is arranged outside a display unit on a touch panel, a key operation control thereof, and a program.

BACKGROUND ART

In recent years, an increasing number of portable terminals such as cell phones or PHS (Personal Handyphone System) have a touch panel. There is a known portable terminal in which a touch panel is arranged on a display unit and at a part other than the display unit and a key part is arranged outside the display unit on the touch panel. An example thereof is illustrated in FIG. 9.

FIG. 9 illustrates a structure of a touch panel used for a portable terminal in a related art. A touch panel 1 illustrated in FIG. 9 is arranged on a display unit 2 and on a part other than the display unit 2 extended from the display unit 2. Touch keys 31 (three touch keys S1, S2, and S3 in the illustrated example) configuring a key part 3 are arranged outside the display unit 2 on the touch panel 1. With the structure, when a finger touches the touch panel 1, a coordinate corresponding to the touched position on the touch panel 1 is notified to a CPU (Central Processing unit) (not illustrated) at certain intervals, and a user's touch on the touch key S1, S2 or S3 is processed as key pressing.

In this case, when the user slides a finger toward the key part 3 from a position P11 on the display unit 2 on the touch panel 1 to a position P12, if the finger erroneously goes to the outside of the display unit 2 and erroneously touches a position P13 of the touch key S1 in the key part 3, the erroneous touch is processed as key pressing on the touch key S1, which causes an erroneous operation.

In order to prevent such an erroneous operation, there is considered that a distance (area B in the Figure) between the display unit 2 and the touch keys S1, S2, S3 is made longer, but this has a drawback that the device increases in size.

There is further considered that a touch is not processed as key pressing until the finger's touch on the touch key S1, S2 or S3 is detected for a certain period of time, and this obtains some advantageous effects but an erroneous operation is difficult to be eliminated.

There is further considered that when a finger is placed on the display unit 2 of the touch panel 1, the placement is not processed as key pressing until the finger is released or a certain period of time elapses from the release of the finger, but in this case, there is a drawback that if while the finger maintains placed on a position P31 on the display unit 2 in the Figure, for example, other finger touches the position P13 of the touch key S1 in the key part 3 or a position P23 of the couch key S3, the touch is not processed as key pressing.

There is further considered a method for detecting that a finger is slid from the display unit 2 toward the touch keys S1, S2 and S3 and controlling subsequent key pressing, but in this case, there is a drawback that a processing of detecting the finger sliding increases. With the method, for example, when the user slides a finger from a position P21 on the display unit 2 toward a position P22 to release from the touch key S3 side, if the finger erroneously touches the position p23 of the touch key S3 in the key part 3 before touching the position P21 on the display unit 2, an erroneous operation cannot be prevented.

As a prior art for preventing an erroneous operation of a touch panel in relation to the above, Patent Literature 1 describes therein an image display device for setting a prohibition area on a touch panel, if a finger erroneously touches the prohibition area for erroneous input, erasing the displays of icons, and displaying an alarm therefor. The device causes the user to recognize the situation, thereby to prevent an erroneous operation or the like.

Patent literature 2 describes therein an information processing apparatus comprising a touch panel on a display unit for counting a touch duration onto a predetermined region on the display unit, and controlling to perform a function assigned to a specific region when the touch duration from a touch state onto the specific region to a touch-up state does not reach a predetermined time, and not to perform the function assigned to the specific region when the touch duration reaches the predetermined time. Thereby, erroneous operations on the touch panel can be more accurately reduced without limiting a layout of the touch operation unit on the touch panel.

CITATION LIST

Patent Literature

{PTL 1} JP-A-2009-009424
{PTL 2} JP-A-2011-039990

SUMMARY OF INVENTION

Technical Problem

Patent Literatures 1 and 2 intend to prevent the icons displayed on the display unit or the functions assigned in a specific region from erroneously being operated, are for a key part arranged outside the display unit on the touch panel as illustrated in FIG. 7, and do not consider prevention of erroneous operations when a user erroneously touches the key part outside the display unit while operating the display unit.

It is an object of the present invention to provide a portable terminal capable of solving the above problems, and preventing a user from erroneously touching a key part arranged outside a display unit of a touch panel during operation of the display unit via the touch panel thereby to reduce erroneous operations, a method for controlling a key operation of the same, and a program.

Solution to Problem

According to a first aspect of the present invention, there is provided a portable terminal including:

a display unit:

a touch panel which is arranged on the display unit and a part other than the display unit extended from the display unit, the touch panel detecting a position touched by a user on the display unit and outside the display unit;

a key part which is arranged outside the display unit on the touch panel, the key part detecting key pressing via the touch panel; and a control unit which, when detecting that the user touches a detection area set near the key part of the display unit via the touch panel, even if detecting that the user touches the key part, does not process the touch on the key part as key pressing.

According to a second aspect of the present invention, there is provided a method for controlling a key operation of a portable terminal, the portable terminal comprising a display unit, a touch panel which is arranged on the display unit and a part other than the display unit extended from the display unit and detects a position touched by a user on the display unit and outside the display unit, and a key part which is arranged outside the display unit on the touch panel and detects key pressing via the touch panel, wherein when detecting that the user touches a detection area set near the key part of the display unit via the touch panel, even if detecting that the user touches the key part, a control unit does not process the touch on the key part as key pressing.

According to a third aspect of the present invention, there is provided a key operation control program for a portable terminal, the portable terminal comprising a display unit, a touch panel which is arranged on the display unit and a part other than the display unit extended from the display unit and detects a position touched by a user on the display unit and outside the display unit, and a key part which is arranged outside the display unit on the touch panel and detects key pressing via the touch panel, the program causing a computer to function as a control unit which, when detecting that the user touches a detection area set near the key part of the display unit via the touch panel, even if detecting that the user touches the key part, does not process the touch on the key part as key pressing.

Advantages Effects of the Invention

According to the present invention, it is possible to prevent a user from erroneously touching a key part arranged outside a display unit of a touch panel during an operation of the display unit via the touch panel, thereby to reduce erroneous operations.

BRIEF DESCRIPTION OF DRAWINGS

FIG. 8 A flowchart explains the operation of the portable terminal using the touch panel illustrated in FIG. 6.

FIG. 9 A figure illustrates a structure of a touch panel used in a portable terminal according to a related art.

DESCRIPTION OF EMBODIMENTS

Embodiments of a portable terminal, a method for controlling a key operation of the same, and a program according to the present invention will be described below in detail with reference to the drawings.

First Embodiment

Figure 1:
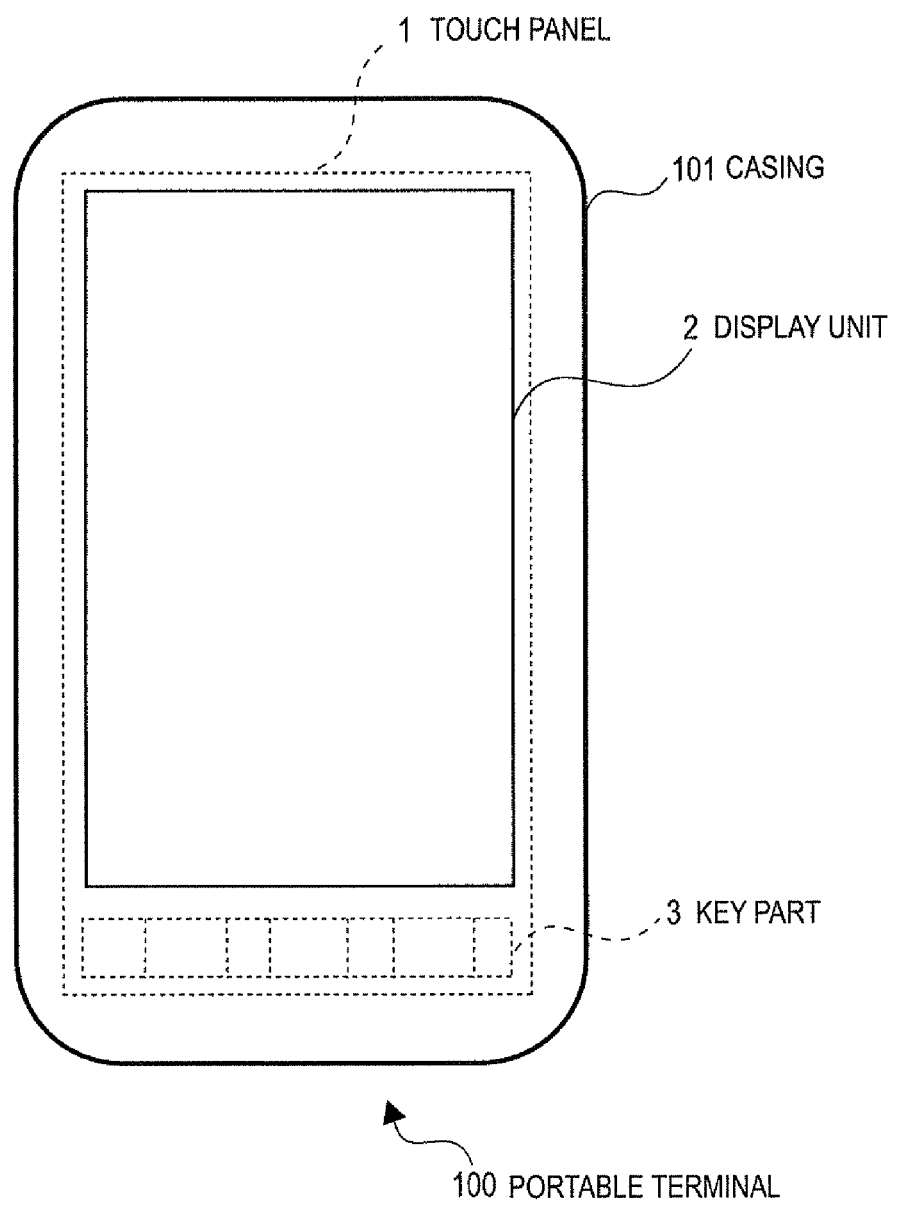
FIG. 1 A front view illustrates a portable terminal according to a first embodiment of the present invention.

FIG. 1 illustrates a portable terminal according to a first embodiment of the present invention. As illustrated, a portable terminal 100 is configured of a portable terminal device such as cell phone or PHS (Personal Handyphone System), and has a casing 101 forming the main body having a user-portable predetermined shape (such as a rectangular shape), and a touch panel 1 is arranged on the front side of the casing 101. The touch panel 1 may employ any system such as electrostatic capacitance system or resistive film system capable of detecting a position touched by a user's finger.

Figure 2:
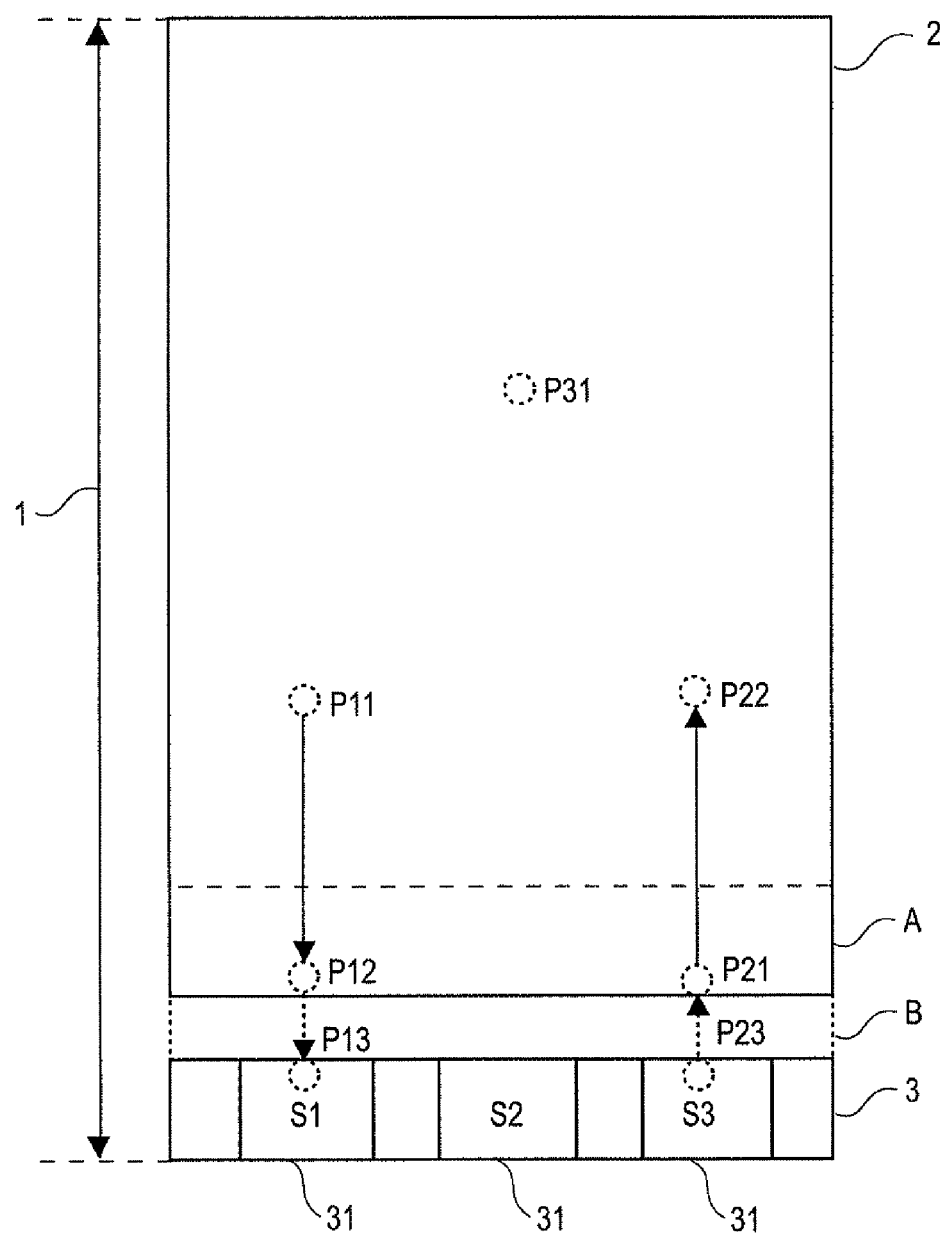
FIG. 2 A figure illustrates a structure of a touch panel illustrated in FIG. 1

FIG. 2 illustrates a structure of the touch panel 1. As illustrated, the touch panel 1 is arranged on a display unit 2 such as a liquid crystal display and on a part other than the display unit 2 extended from the display unit 2. A key part 3 is arranged outside the display unit 2 on the touch panel 1 to be separated from the display unit 2 by a predetermined interval (a part on the boundary between the key part 3 and the display unit 2 will be called area B (boundary area) below).

A plurality of touch keys 31 (three touch keys S1, S2 and S3 in the illustrated example) are arranged in the key part 3. As exemplary touch keys 31, a key (which may be called "menu key") for displaying a menu screen, a key (which may be called "back key") for returning to a previous screen, and a key (which may be called "home key") for returning to a home screen (initial display screen), which are used for a screen operation, are illustrated by way of example. In the example of FIG. 2, there may be set such that the left touch key S1 functions as a menu key, the middle touch key S2 functions as a home key and the right touch key S3 functions as a back key. The example of FIG. 2 illustrates three touch keys 31, but the number of keys is not limited thereto and may be one, two, four or more.

An area A (detection area) for preventing an erroneous operation of the key part 3 is previously set near the key part 3 in the areas on the display unit 2 of the touch panel 1, or opposite to the key part 3 across the area B. The area A may be set in a range where the touch panel 1 can make one notification at a interval notified to a CPU 11 when the user slides a finger on the touch panel 1, but the present invention is not necessarily limited thereto and the area A may be set in a range where two or more notifications can be made, for example.

Figure 3:
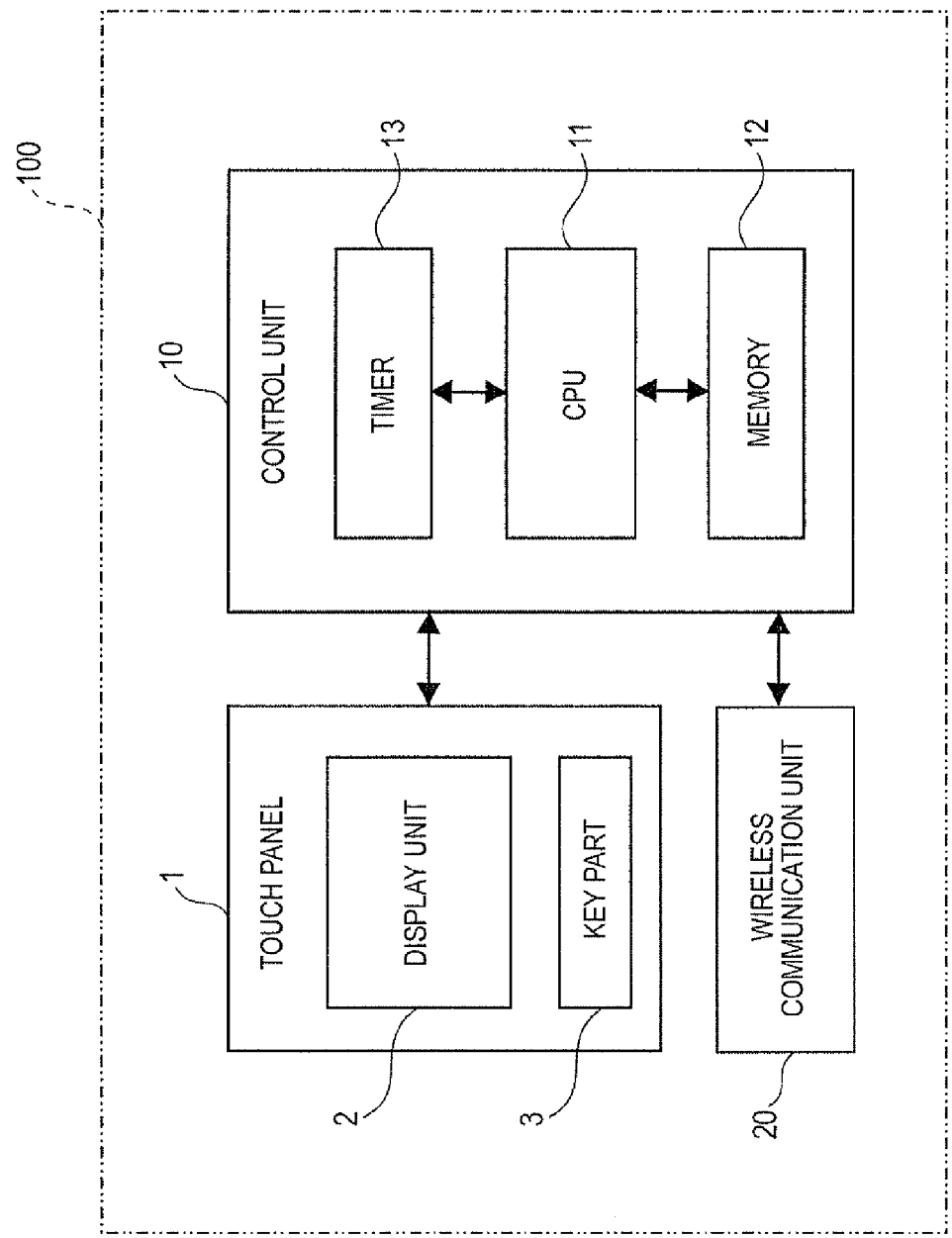
FIG. 3 A block diagram illustrates an inner structure of the portable terminal illustrated in FIG. 1.

FIG. 3 illustrates an inner structure of the portable terminal 100. The portable terminal 100 includes a control unit 10 and a wireless communication unit 20 in addition to the touch panel 1, the display unit 2 and the key part 3 as illustrated in FIG. 3. Other constituents will be omitted for convenient description.

The wireless communication unit 20 has a transmission/reception circuit including an antenna, and can wirelessly communicate with a base station (not illustrated).

The control unit 10 is configured of a microcomputer (or microcontroller), for example, and includes the CPU 11 operated by program control, a memory 12 for storing control programs therefor therein, and a timer 13 for counting a set time, and the CPU 11 executes a control program in the memory 12 to control each operation of the portable terminal 100. The control programs include various control programs for well-known portable terminals, and further a key operation control program for preventing an erroneous operation of the key part 3 in the present embodiment.

When a user's finger touches the touch panel 1, the coordinate on the touch panel is notified to the CPU 11 at certain intervals, and the user's touch on the touch key S1, S2 or S3 is processed as key pressing.

According to the present embodiment, when detecting a touch on a coordinate in the area A on the display unit 2 via the touch panel 1, the CPU 11 controls so as not to process the touch as key pressing until a certain period of time elapses or the finger is released from the touch panel 1.

When detecting a touch of a finger on the touch key S1, S2 or S3 via the touch panel 1, the CPU 11 controls so as not to process the touch as key pressing for a certain period of time, and when detecting a touch on a coordinate in the area B or the area A within the certain period of time, the CPU 11 controls so as not to perform a key press processing.

The operations according to the present embodiment will be described below with reference to FIGS. 4 and 5. The key operation control programs corresponding to the flowcharts of FIGS. 4 and 5 are previously set in the memory 12 in the control unit 10, for example, and are executed by the CPU 11 in the control unit 10.

Figure 4:
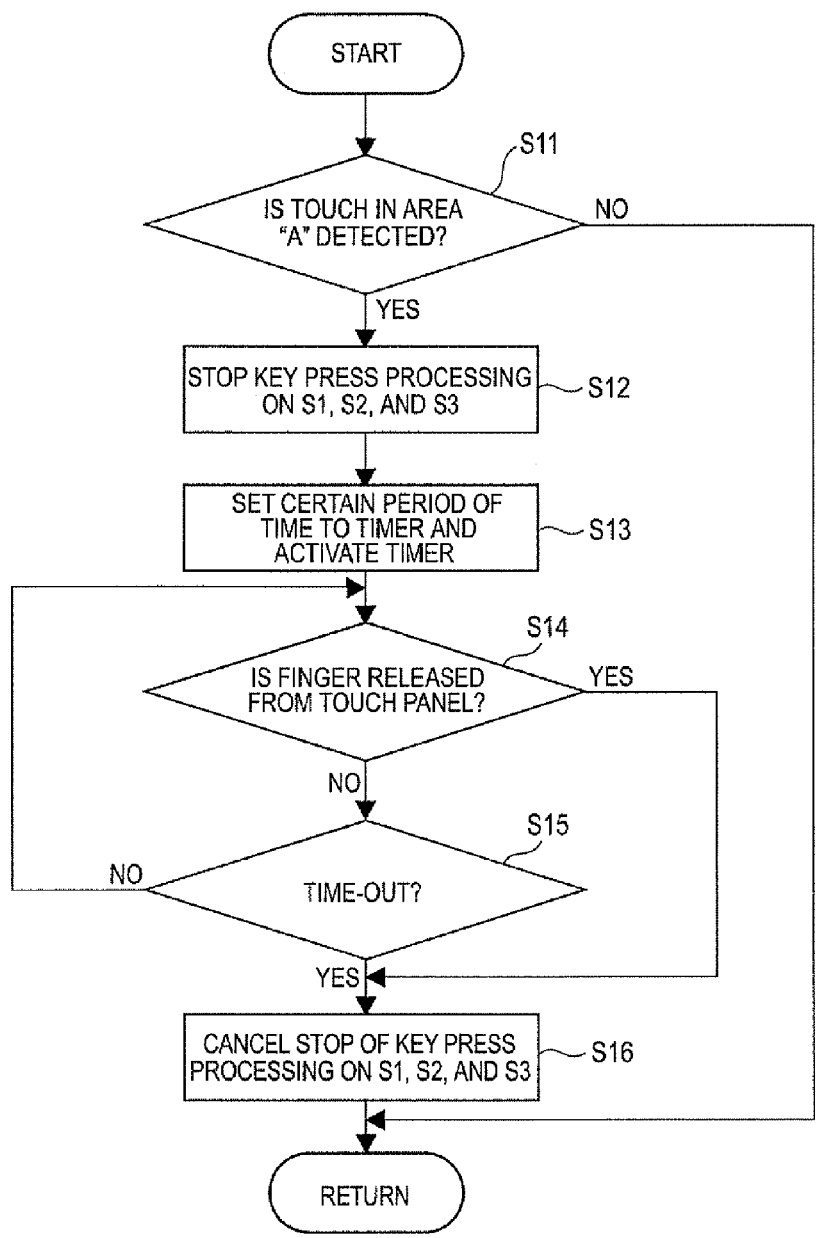
FIG. 4 A flowchart explains the operations of the portable terminal illustrated in FIG. 1.
Figure 5:
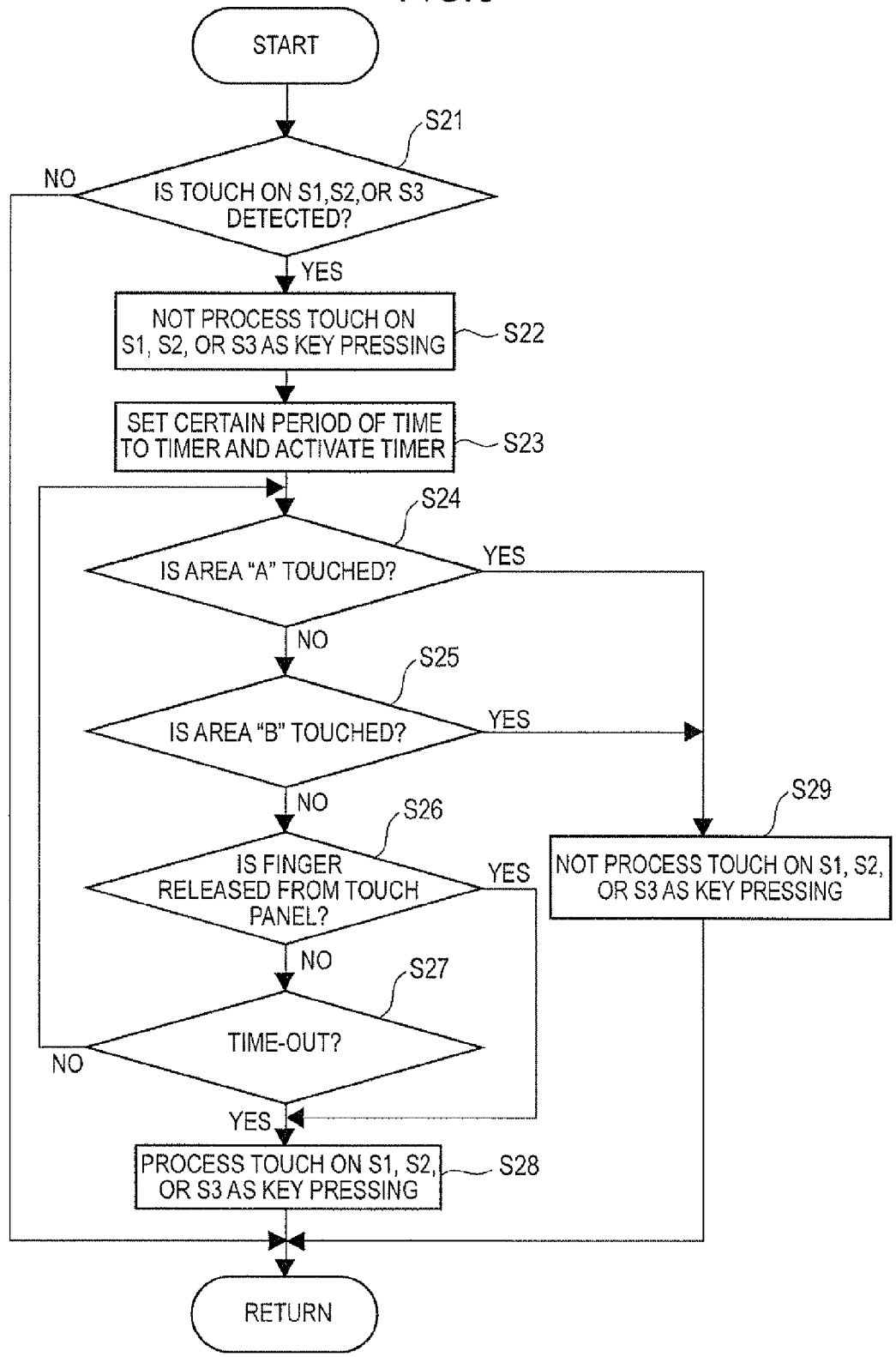
FIG. 5 A flowchart explains the operations of the portable terminal illustrated in FIG. 1.

FIG. 4 explains the operations when a touch around the key part 3 of the display unit 2 is detected.

In FIG. 4, when detecting a touch in the area A on the display unit 2 via the touch panel 1 (YES in step S11), the CPU 11 stops a key press processing on the touch keys S1, S2 and S3 (step S12), sets the timer 13 in the control unit 10 at a certain period of time thereby to activate the timer (step S13), and determines whether the finger is released from the touch panel 1 (step S14).

Consequently, when determining that the finger is not released from the touch panel 1 (NO in step S14), the CPU 11 determines whether the timer 13 counts the set certain period of time and times out (step S15). As a result, when determining that the timer does not time out (NO in step S15), the CPU 11 returns to step S14 to repeat the same processing.

On the other hand, when determining that the finger is released from the touch panel 1 (YES in step S14), or when determining that the timer times out (YES in step S15), the CPU 11 cancels stopping of the key press processing on the touch keys S1, S2 and S3 (step S16).

Thereby, as illustrated in FIG. 2, when a finger is slid toward the key part 3 from a position P11 on the display unit 2 on the touch panel 1 to a position P12, a touch in the area A is absolutely detected. Then, the key press processing on the touch keys S1, S2 and S3 is stopped until a certain period of time elapses or the finger is released from the touch panel 1, and thus, even if the finger passes the position P12 on the display 2, reaches the outside of the display unit 2 and erroneously touches a position P13 of the touch key S1, the erroneous touch is not processed as key pressing.

As illustrated in FIG. 2, even if other finger is placed on a position P31 out of the area A on the display unit 2 of the touch panel 1, for example, the touch on the touch key S1, S2 or S3 is processed as key pressing unless a touch in the area A on the display unit 2 is detected.

FIG. 5 explains the operations when a touch on the touch key S1, S2 or S3 is detected.

In FIG. 5, when detecting that a finger touches the touch key S1, S2 or S3 via the touch panel 1 (YES in step S21), the CPU 11 does not process the touch on the touch key S1, S2 or S3 as key pressing (step S22), sets the timer 13 in the control unit 10 at a certain period of time thereby to activate the timer 13 (step S23), and determines whether a touch in the area A or the area B is detected and whether the finger is released from the touch panel 1 (steps S24 to S26).

Consequently, when a touch in the area A or the area B is not detected (NO in step S24, NO in step S25), and when the finger is not released from the touch panel 1 (NO in step S27), the CPU 11 determines whether the timer 13 counts the set certain period of time and times out (step S27).

As a result, when determining that the timer does not time out (NO in step S27), the CPU 11 returns to step S24 to repeat the same processing. On the other hand, when determining that the timer times out (YES in step S26), the CPU 11 processes the touch on the touch key S1, S2 or S3 as key pressing (step S28).

On the other hand, when a touch in the area A or the area B is detected (YES in step S24, YES in step S25), the CPU 11 does not process the touch on the touch key S1, S2 or S3 as key pressing (step S29). When the finger is released from the touch panel 1 (YES in step S26), the CPU 11 processes the touch on the touch key S1, S2 or S3 as key pressing (step S28).

Thereby, as illustrated in FIG. 2, when a finer is slid from a position P 21 to a position P 22 on the display unit 2 away from the key part 3, even if the finger erroneously touches a position P 23 of the touch key S3 in the key part 3 before touching the position P 21 on the display unit 2, the erroneous touch is not processed as key pressing.

Therefore, according to the present embodiment, the portable terminal 100 in which the touch panel 1 is arranged on the display unit 2 and a part extended from the display unit 2 and the part arranged outside the display unit 2 is used as the key part 3 can prevent the user from erroneously touching the key part 3 and causing an erroneous operation.

Since the area A on the display 2 in FIG. 2 may be such that the touch panel 1 can make one notification at an interval notified to the CPU 11 when the user slides a finger onto the touch panel 1, even if a finger touches the touch key S1, S2 or S3, the touch is not determined as key pressing in spite of the other finger being touching the touch panel 1.

In the present embodiment, a key operation is not prohibited until a touch in the area A is detected, and thus a normal touch processing is simplified.

Further, in the present embodiment, the distance between the display unit 2 and the touch keys S1, S2, S3 does not need to be prolonged for preventing an erroneous operation of the key part 3, and correspondingly the device does not grow in size.

The present embodiment does not need an operation that a touch is not processed as key pressing until a touch of a finger on the touch key S1, S2 or S3 is detected within a certain period of time in order to prevent an erroneous operation of the key part 3, thereby reducing erroneous operations.

Further, the present embodiment does not need a method for detecting that a finger is slid from the display unit 2 toward the touch keys S1, S2 and S3 and then controlling subsequent key pressing in order to prevent an erroneous operation of the key part 3, thereby restricting the processing of detecting a slide of the finger from increasing.

The operations when a touch in the area A is detected are described in the example of FIG. 4, but the key press processing on the key part 3 may be stopped for a certain period of time also when a touch in the area B is detected. Alternatively, when a touch in the area A or the area B is detected, the key press processing on the key part 3 may be stopped for a certain period of time.

The example of FIG. 5 explains the processings (steps S24 and S25) of determining whether a touch in the area A or the area B is detected until the timer times out after being set at a certain period of time, and the processing (step S26) of determining whether the finger is released from the touch panel 1, but the processing in step S26 may be omitted.

Second Embodiment

A second embodiment according to the present invention will be described below with reference to FIG. 6.

Figure 6:
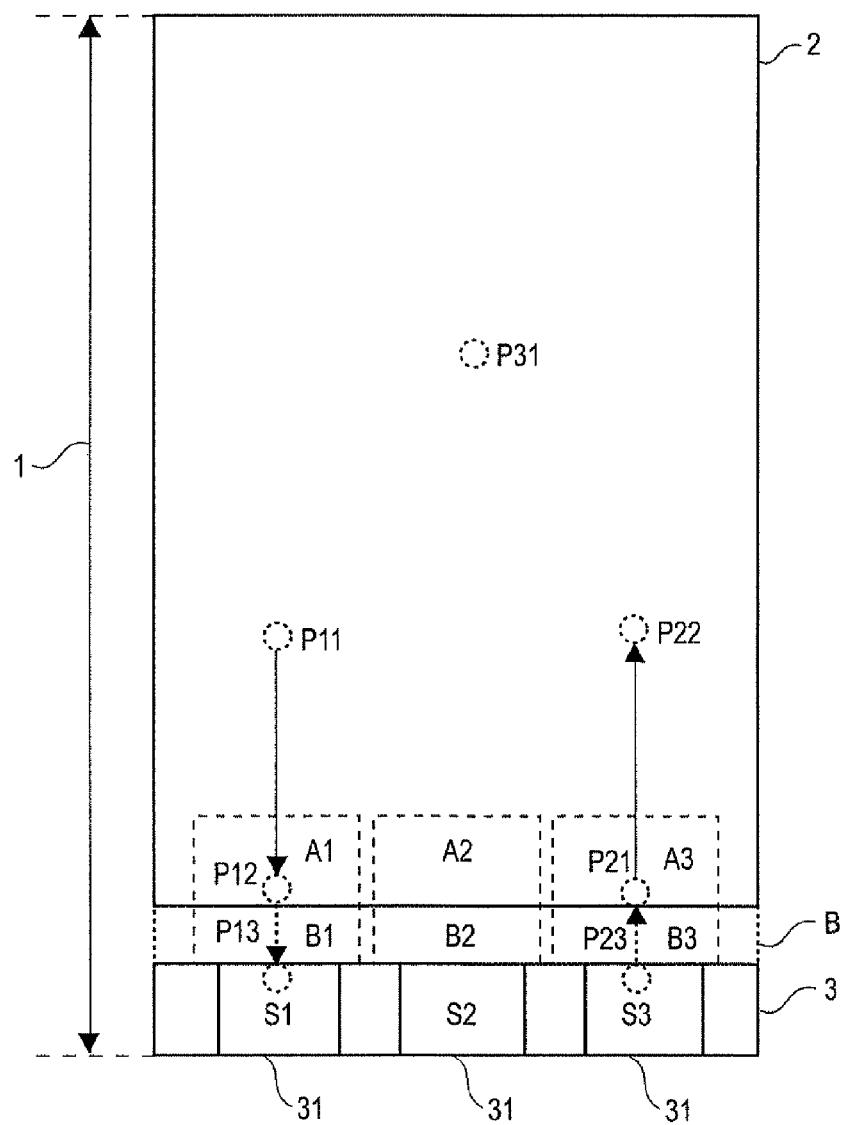
FIG. 6 A figure illustrates a structure of a touch panel used for a portable terminal according to a second embodiment of the present invention.

FIG. 6 illustrates a structure of the touch panel 1 used for a portable terminal according to the present embodiment. One area A (detection area) on the display unit 2 is set to be common among the touch keys S1, S2 and S3 according to the first embodiment, while a plurality of areas A1, A2 and A3 (detection areas) are assigned to the touch keys S1, S2 and S3, respectively, according to the present embodiment as illustrated in FIG. 6. Correspondingly, a plurality of areas B1, B2 and B3 (boundary areas) are assigned in the area B (boundary area) between the display unit 2 and the key part 3. Other structure is the same as the first embodiment.

In this case, assuming the areas A1, A2 and A3 on the display unit 2 corresponding to the touch keys S1, S2 and S3 in the key part 31, the CPU 11 stops detecting key pressing on the touch key S1 for a certain period of time when detecting a touch in the area A1, stops detecting key pressing on the touch key S2 for a certain period of time when detecting a touch in the area A2, and stops detecting key pressing on the touch key S3 for a certain period of time when detecting a touch in the area A3.

The operations of the present embodiment will be described below with reference to FIGS. 7 and 8. The key operation control programs corresponding to the flowcharts of FIGS. 7 and 8 are previously set in the memory 12 in the control unit 10, for example, and are executed by the CPU 11 in the control unit 10.

Figure 7:
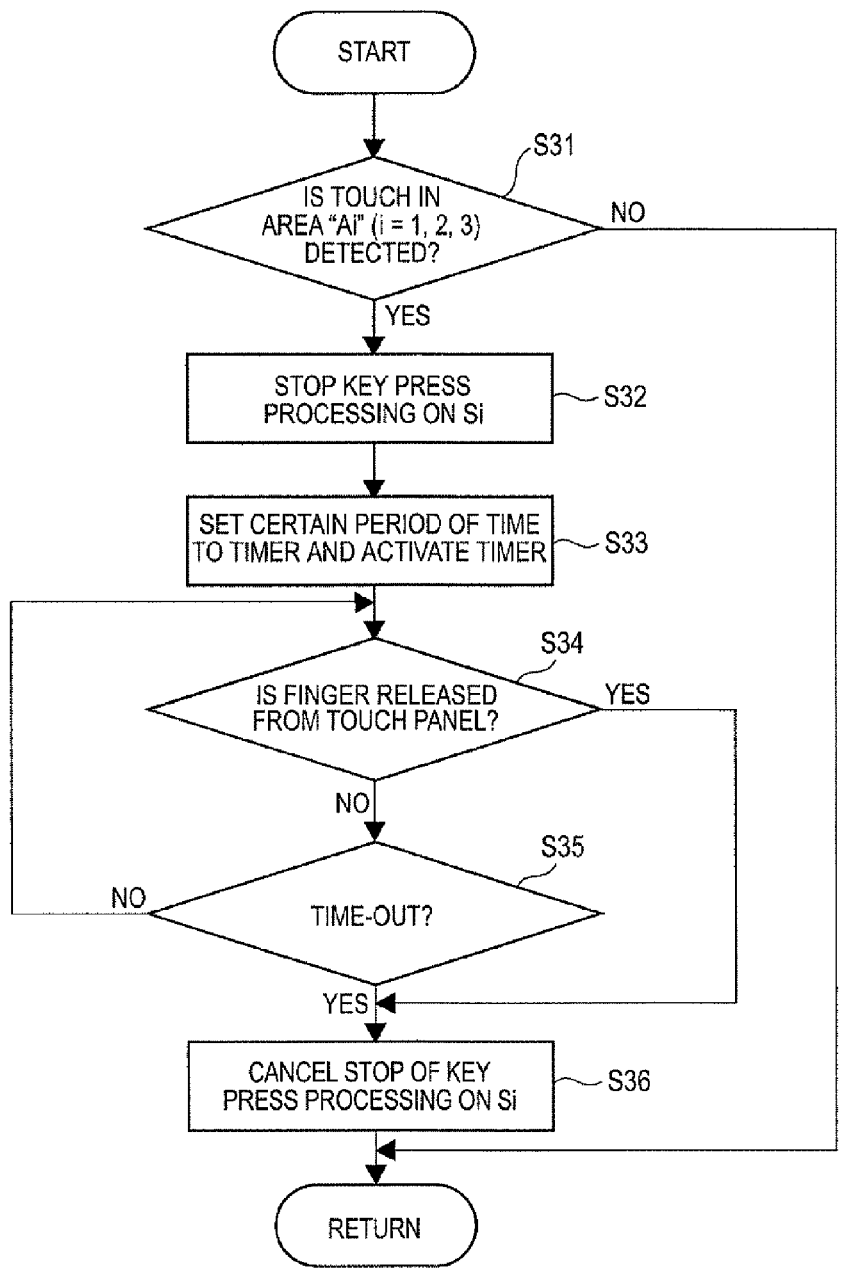
FIG. 7 A flowchart explains the operations of the portable terminal using the touch panel illustrated in FIG. 6.

FIG. 7 explains the operation when a touch in an area Ai (i=1, 2, 3) on the display unit 2 near the key part 3 is detected.

In FIG. 7, when detecting a touch in an area Ai (i=1, 2, 3) on the display unit 2 via the touch panel 1 (YES in step S31), the CPU 11 stops the key press processing on a touch key S1 corresponding to the area Ai (step S32), sets the timer 13 in the control unit 10 at a certain period of time thereby to activate the timer 13 (step S33), and determines whether the finer is released from the touch panel 1 (step S34).

Consequently, when determining that the finger is not released from the panel 1 (NO in step S34), the CPU 11 determines whether the timer counts the set certain period of time and times out (step S35). As a result, when determining that the timer does not time out (NO in step S35), the CPU 11 returns to step S34 to repeat the same processing.

On the other hand, when determining that the finger is released from the touch panel 1 (YES in step S34) or when determining that the timer times out (YES in step S35), the CPU 11 cancels stopping of the key press processing on the touch keys S1 (step S36).

FIG. 8 explains the operations when a touch on a touch key S1 (i=1, 2, 3) is detected.

In FIG. 5, when detecting that a finger touches a touch key S1 via the touch panel 1 (YES in step S41), the CPU 11 does not process the touch on the touch key S1 as key pressing (step S42), sets the timer 13 in the control unit 10 at a certain period of time thereby to activate the timer 13 (step S43), and determines whether a touch in an area Ai or an area Bi assigned to the touch key S1 is detected and whether the finger is released from the touch panel (steps S44 to S46).

Consequently, when a touch in an area Ai or an area Bi is not detected (NO in step S44, NO in step S45) and when the finger is not released from the touch panel 1 (step S46: NO), the CPU 11 determines whether the timer 13 counts the set certain period of time and times out (step S47).

As a result, when determining that the timer does not time out (NO in step S47), the CPU 11 returns to step S44 to repeat the same processing. On the other hand, when determining that the timer times out (YES in step S47), the CPU 11 processes the touch on the touch key S1 as key pressing (step S48).

On the other hand, when a touch in an area Ai or an area Bi is detected (YES in step S44, YES in step S45), the CPU 11 does not perform a key press processing on the touched touch key S1 (step S49). When the finger is released from the touch panel 1 (YES in step S46), the CPU 11 processes the touch on the touch key S1 as key pressing (step S48).

Thereby, according to the present embodiment, even if another finger is placed on an area (which will be called area A1 below), only the touch key S1 corresponding to the area A1 is disabled to press for a certain period of time, and the touch keys S2 and S3 corresponding to the areas A2 and A3 are enabled to press.

The example of FIG. 6 illustrates three touch keys 31, but the number of keys is not limited thereto and may be two, four or more and the numbers of areas A and B may be correspondingly two, four or more, respectively.

The example of FIG. 7 explains the operations when a touch in an area Ai is detected, but the key press processing on the touch keys S1 may be stopped for a certain period of time also when a touch in an area Bi is detected. Alternatively, when a touch in an area Ai or an area Bi is detected, the key press processing on the touch keys S1 may be stopped for a certain period of time.

The example of FIG. 8 explains the processings (steps S44 and S45) of determining whether a touch in an area Ai or an area Bi is detected and the processing (step S46) of determining whether the finger is released from the panel 1 until the timer times out after being set at a certain period of time, but the processing in step S46 may be omitted.

There has been described the portable terminal according to each of the embodiments in which the area B (boundary area) is present between the display unit 2 on the touch panel 1 and the key part 3, but the present invention is not necessarily limited thereto, and may be applied to a variant in which the display unit 2 and the key part 3 directly contact with each other without the area B. In this case, the area A (detection area) directly contacts to the key part 3.

The portable terminal and the method for controlling a key operation of the same can be achieved in hardware, in software or in a combination thereof. The structure in hardware, in software or in a combination thereof in this case is not particularly limited, and any form capable of realizing the above functions may be applied.

Part of or all the embodiments may be described as in the following supplementary notes, but are not limited to the following.

(Supplementary note 1) A portable terminal comprising:
a display unit:
a touch panel which is arranged on the display unit and a part other than the display unit extended from the display unit, the touch panel detecting a position touched by a user on the display unit and outside the display unit;
a key part which is arranged outside the display unit on the touch panel, the key part detecting key pressing via the touch panel; and a control unit which, when detecting that the user touches a detection area set near the key part of the display unit via the touch panel, even if detecting that the user touches the key part, does not process the touch on the key part as key pressing.

(Supplementary note 2) The portable terminal according to supplementary note 1, wherein when detecting that the user touches the detection area, the control unit does not process the detected touch on the key part as key pressing until a certain period of time elapses or the user's touch is released from the touch panel.

(Supplementary note 3) The portable terminal according to supplementary note 1 or 2, wherein when detecting that the user touches the key part, the control unit does not process the touch on the key part as key pressing for a certain period of time, and when detecting that the user touches the detection area or a boundary area within the certain period of time, the control unit does not perform a key press processing on the key part.

(Supplementary note 4) The portable terminal according to any one of supplementary notes 1 to 3,
wherein a plurality of keys are arranged in the key part, a plurality of detection areas and a plurality of boundary areas are assigned for the detection area and the boundary area depending on the keys, and
when detecting that the user touches any of the detection areas via the touch panel, the control unit does not process, as key pressing, the detected touch on any of the keys according to any of the detection areas touched by the user.

(Supplementary note 5) The portable terminal according to supplementary note 4, wherein when detecting that the user touches any of the detection areas, the control unit stops a key press processing on any of the keys according to any of the detection areas touched by the user until a certain period of time elapses or the user's touch is released from the touch panel.

(Supplementary note 6) The portable terminal according to supplementary note 4 or 5, wherein when detecting that the user touches any of the keys, the control unit does not process the touch on any of the keys as key pressing, and when detecting that the user touches any of the detection areas or any of the boundary areas according to any of the keys within the certain period of time, the control unit does not perform a key press processing on the key part.

(Supplementary note 7) The portable terminal according to any one of supplementary notes 1 to 6, wherein the detection area is set in a range in which a detection signal of the touch panel can be notified predetermined times at an interval notified to the control unit when a user's touch is slid on the touch panel.

(Supplementary note 8) The portable terminal according to supplementary note 1, wherein the display unit and the key part directly contact with each other, and the detection area and the key part directly contact with each other.

(Supplementary note 9) A method for controlling a key operation of a portable terminal, the portable terminal comprising a display unit, a touch panel which is arranged on the display unit and a part other than the display unit extended from the display unit and detects a position touched by a user on the display unit and outside the display unit, and a key part which is arranged outside the display unit on the touch panel and detects key pressing via the touch panel,
wherein when detecting that the user touches a detection area set near the key part of the display unit via the touch panel, even if detecting that the user touches the key part, a control unit does not process the touch on the key part as key pressing.

(Supplementary note 10) The method for controlling a key operation of a portable terminal according to supplementary note 9, wherein when detecting that the user touches the detection area, the control unit does not process the detected touch on the key part as key pressing until a certain period of time elapses or the user's touch is released from the touch panel.

(Supplementary note 11) The method for controlling a key operation of a portable terminal according to supplementary note 9 or 10, wherein when detecting that the user touches the key part, the control unit does not process the touch on the key part as key pressing for a certain period of time, and when detecting that the user touches the detection area or the boundary area within the certain period of time, the control unit does not perform a key press processing on the key part.

(Supplementary note 12) The method for controlling a key operation of a portable terminal according to any one of supplementary notes 9 to 11, wherein a plurality of keys are arranged in the key part, a plurality of detection areas and a plurality of boundary areas are assigned for the detection area and the boundary area according to the keys, and when detecting that the user touches any of the detection areas via the touch panel, the control unit does not process, as key pressing, the detected touch on any of the keys according to any of the detections areas touched by the user.

(Supplementary note 13) The method for controlling a key operation of a portable terminal according to supplementary note 12, wherein when detecting that the user touches any of the detection areas, the control unit does not stop a key press processing on any of the keys according to any of the detection areas touched by the user until a certain period of time elapses or the user's touch is released from the touch panel.

(Supplementary note 14) The method for controlling a key operation of a portable terminal according to supplementary note 12 or 13, wherein when detecting that the user touches any of the keys, the control unit does not process the touch on any of the keys as key pressing, and when detecting that the user touches any of the detection areas or any of the boundary areas according to any of the keys within the certain period of time, the control unit does not perform a key press processing on the key part.

(Supplementary note 15) The method for controlling a key operation of a portable terminal according to any one of supplementary notes 9 to 14, wherein the detection area is set in a range in which a detection signal of the touch panel can be notified predetermined times at an interval notified to the control unit when a user's touch is slid on the touch panel.

(Supplementary note 16) The method for controlling a key operation of a portable terminal according to supplementary note 9, wherein the display unit and the key part directly contact with each other, and the detection area and the boundary area directly contact with each other.

(Supplementary note 17) A key operation control program for a portable terminal, the portable terminal comprising a display unit, a touch panel which is arranged on the display unit and a part other than the display unit extended from the display unit and detects a position touched by a user on the display unit and outside the display unit, and a key part which is arranged outside the display unit on the touch panel and detects key pressing via the touch panel,
the program causing a computer to function as a control unit which, when detecting that the user touches a detection area set near the key part of the display unit via the touch panel, even if detecting that the user touches the key part, does not process the touch on the key part as key pressing.

(Supplementary note 18) The key operation control program for a portable terminal according to supplementary note 17, wherein when detecting that the user touches the detection area, the control unit does not process the detected touch on the key part as key pressing until a certain period of time elapses or the user's touch is released from the touch panel.

(Supplementary note 19) The key operation control program for a portable terminal according to supplementary note 17 or 18, wherein when detecting that the user touches the key part, the control unit does not process the touch on the key part as key pressing for a certain period of time, and when detecting that the user touches the detection area or the boundary area within the certain period of time, the control unit does not perform a key press processing on the key part.

(Supplementary note 20) The key operation control program for a portable terminal according to any one of supplementary notes 17 to 20, wherein a plurality of key are arranged in the key part, a plurality of detection areas and a plurality of boundary areas are assigned for the detection area and the boundary area according to the keys, and when detecting that the user touches any of the detection areas via the touch panel, the control unit does not process, as key pressing, the detected touch on any of the keys according to any of the detection areas touched by the user.

(Supplementary note 21) The key operation control program for a portable terminal according to supplementary note 19, wherein when detecting that the user touches any of the detection areas, the control unit does not stop a key press processing on any of the keys according to any of the detection areas touched by the user until a certain period of time elapses or the user's touch is released from the touch panel.

(Supplementary note 22) The key operation control program for a portable terminal according to supplementary note 20 or 21, wherein when detecting that the user touches any of the keys, the control unit does not process the touch on any of the keys as key pressing, and when detecting that the user touches any of the detection areas or any of the boundary areas according to any of the keys within the certain period of time, the control unit does not perform a key press processing on the key part.

(Supplementary note 23) The key operation control program for a portable terminal according to any one of supplementary notes 17 to 21, wherein the detection area is set in a range in which a detection signal of the touch panel can be notified predetermined times at a interval notified to the control unit when a user's touch is slid on the touch panel.

(Supplementary note 24) The key operation control program for a portable terminal according to supplementary note 17, wherein the display unit and the key part area directly contact with each other and the detection area and the key part directly contact with each other.

The present invention has been described above with reference to the embodiments, but the present invention is not limited to the above embodiments. The structure and details of the present invention may be variously changed within the scope of the present invention understood by those skilled in the art.

The present application claims the priority based on Japanese Patent Application No. 2011-120345 filed on May 30, 2011, all of which is incorporated herein by reference.

INDUSTRIAL APPLICATION

As described above, the present invention is a portable terminal device such as a cell phone or a PHS (Personal Handyphone System), and is applicable to a terminal device having a touch panel, a method for controlling a key operation of the same, and a program.

REFERENCE SIGNS LIST

1 Touch panel
2 Display unit
3 Key part
10 Control unit
11 CPU
12 Memory
13 Timer
20 Wireless communication unit
31 Touch key
100 Portable terminal
101 Casing

What is claimed is:
1. A portable terminal comprising:
a display unit:
a touch panel which is arranged on the display unit and a part other than the display unit extended from the display unit, the touch panel detecting a position touched by a user on the display unit and outside the display unit;
a key part which is arranged outside the display unit on the touch panel, the key part detecting key pressing via the touch panel; and
a control unit which performs first control and second control,
the first control being control which, when detecting that the user touches a detection area set near the key part of the display unit via the touch panel, even if detecting that the user touches the key part, does not process the touch on the key part as key pressing,
the second control being control which, when detecting that the user touches the key part, does not process the touch on the key part as key pressing for a certain period of time, and when detecting that the user touches the detection area or a boundary area within the certain period of time, does not perform a key press processing on the key part regardless of an elapse of the certain period of time, the boundary area being arranged between the display unit and the key part on the touch panel.

2. The portable terminal according to claim 1, wherein when detecting that the user touches the detection area, the control unit does not process the detected touch on the key part as key pressing until a certain period of time elapses or the user's touch is released from the touch panel.

3. The portable terminal according to claim 1,
wherein a plurality of keys are arranged in the key part, a plurality of detection areas and a plurality of boundary areas are assigned for the detection area and the boundary area depending on the keys, and
when detecting that the user touches any of the detection areas via the touch panel, the control unit does not process, as key pressing, the detected touch on any of the keys according to any of the detection areas touched by the user.

4. The portable terminal according to claim 3, wherein when detecting that the user touches any of the detection areas, the control unit stops a key press processing on any of the keys according to any of the detection areas touched by the user until a certain period of time elapses or the user's touch is released from the touch panel.

5. The portable terminal according to claim 3, wherein when detecting that the user touches any of the keys, the control unit does not process the touch on any of the keys as key pressing, and when detecting that the user touches any of the detection areas or any of the boundary areas according to any of the keys within the certain period of time, the control unit does not perform a key press processing on the key part.

6. The portable terminal according to claim 1, wherein the detection area is set in a range in which a detection signal of the touch panel can be notified predetermined times at an interval notified to the control unit when a user's touch is slid on the touch panel.

7. A method for controlling a key operation of a portable terminal, the portable terminal comprising a display unit, a touch panel which is arranged on the display unit and a part other than the display unit extended from the display unit and detects a position touched by a user on the display unit and outside the display unit, and a key part which is arranged outside the display unit on the touch panel and detects key pressing via the touch panel, wherein a control unit performs first control and second control, the first control being control which, when detecting that the user touches a detection area set near the key part of the display unit via the touch panel, even if detecting that the user touches the key part, does not process the touch on the key part as key pressing, the second control being control which, when detecting that the user touches the key part, does not process the touch on the key part as key pressing for a certain period of time, and when detecting that the user touches the detection area or a boundary area within the certain period of time, does not perform a key press processing on the key part regardless of an elapse of the certain period of time, the boundary area being arranged between the display unit and the key part on the touch panel.

8. A non-transitory computer readable information storage medium that stores a key operation control program for a portable terminal, the portable terminal comprising a display unit, a touch panel which is arranged on the display unit and a part other than the display unit extended from the display unit and detects a position touched by a user on the display unit and outside the display unit, and a key part which is arranged outside the display unit on the touch panel and detects key pressing via the touch panel, the program causing a computer to function as a control unit which performs first control and second control, the first control being control which, when detecting that the user touches a detection area set near the key part of the display unit via the touch panel, even if detecting that the user touches the key part, does not process the touch on the key part as key pressing, the second control being control which, when detecting that the user touches the key part, does not process the touch on the key part as key pressing for a certain period of time, and when detecting that the user touches the detection area or a boundary area within the certain period of time, does not perform a key press processing on the key part regardless of an elapse of the certain period of time, the boundary area being arranged between the display unit and the key art part on the touch panel.

* * * * *